United States Patent
Fox et al.

(10) Patent No.: US 11,788,297 B2
(45) Date of Patent: Oct. 17, 2023

(54) FITTING FOR A RAIN GUTTER DOWNPIPE

(71) Applicant: F.X. Construction, Inc., Lacombe (CA)

(72) Inventors: Jesse Fox, Lacombe (CA); Garron Rinkel, Esquimalt (CA); Tyler John Brake, Red Deer (CA)

(73) Assignee: F.X. Construction Inc., Lacombe (CA)

( * ) Notice: Subject to any disclaimer, the term of this patent is extended or adjusted under 35 U.S.C. 154(b) by 23 days.

(21) Appl. No.: 17/363,197

(22) Filed: Jun. 30, 2021

(65) Prior Publication Data

US 2021/0404184 A1 Dec. 30, 2021

(30) Foreign Application Priority Data

Jun. 30, 2020 (CA) .................................. CA 3085075

(51) Int. Cl.
| | | |
|---|---|---|
| *F16L 25/08* | (2006.01) | |
| *E04D 13/08* | (2006.01) | |
| *F16L 43/00* | (2006.01) | |
| *F16L 21/00* | (2006.01) | |

(52) U.S. Cl.
CPC .............. *E04D 13/08* (2013.01); *F16L 25/08* (2013.01); *F16L 43/001* (2013.01); *E04D 2013/0833* (2013.01); *E04D 2013/0846* (2013.01); *F16L 21/002* (2013.01)

(58) Field of Classification Search
CPC ............ E04D 13/08; E04D 2013/0833; E04D 2013/0846; E04D 2013/084; F16L 21/002; F16L 25/08; F16L 43/001; F16L 27/0812; F16L 27/0804; F16L 27/0816; F16L 27/08; F16L 27/0861; F16L 27/0841

See application file for complete search history.

(56) References Cited

U.S. PATENT DOCUMENTS

| | | | | |
|---|---|---|---|---|
| 244,446 | A * | 7/1881 | Gilmore ............. | F16L 27/0812 285/280 |
| 445,250 | A * | 1/1891 | Lawless ............. | F16L 27/04 138/120 |
| 1,939,987 | A * | 12/1933 | Klomparens ....... | F16L 27/0841 403/57 |

(Continued)

FOREIGN PATENT DOCUMENTS

| | | | | |
|---|---|---|---|---|
| CA | 2266064 A1 * | 10/1999 | ............. | D06F 58/20 |
| DE | 29709609 U1 * | 7/1997 | .......... | F16L 27/0849 |

(Continued)

*Primary Examiner* — Zachary T Dragicevich
*Assistant Examiner* — James A Linford
(74) *Attorney, Agent, or Firm* — Hoffmann & Baron, LLP

(57) ABSTRACT

A downpipe fitting for coupling between top and bottom ends of a downpipe. The downpipe fitting includes two parts connected together and rotatable relative to one another about a longitudinal axis thereof. The first part has an inlet, sized and shaped to couple with an outlet of a first section of the downpipe, above the downpipe fitting. The second part has an outlet which is sized and shaped to couple with an inlet of a second section of the downpipe, below the downpipe fitting. The inlet and outlet of the fitting define a flow path for rainwater therethrough. Rotation of the second section of downpipe below the downpipe fitting, about the longitudinal axis, is decoupled from the first section of downpipe above the downpipe fitting.

17 Claims, 11 Drawing Sheets

(56) References Cited

U.S. PATENT DOCUMENTS

| | | | |
|---|---|---|---|
| 4,798,028 A * | 1/1989 | Pinion | E04D 13/08 |
| | | | 52/16 |
| 5,150,930 A | 9/1992 | Petty et al. | |
| 5,358,006 A | 10/1994 | Sweers | |
| 5,511,829 A | 4/1996 | Sicotte et al. | |
| 5,673,519 A * | 10/1997 | McCaughan | E04D 13/08 |
| | | | 52/16 |
| 5,813,701 A | 9/1998 | Noble | |
| 6,223,777 B1 | 5/2001 | Smith et al. | |
| 6,273,634 B1 * | 8/2001 | Lohbeck | E21B 43/106 |
| | | | 403/312 |
| 6,318,410 B1 | 11/2001 | Miyajima et al. | |
| 8,590,943 B2 | 11/2013 | McPheat | |
| 8,607,827 B2 | 12/2013 | Bell | |
| 8,801,049 B2 | 8/2014 | Knapp | |
| 8,864,180 B2 | 10/2014 | Harman et al. | |
| 9,091,071 B2 | 7/2015 | Crawford | |
| 10,801,652 B2 | 10/2020 | Bunn, Sr. | |
| 2004/0119288 A1 * | 6/2004 | Scartozzi | F16L 25/08 |
| | | | 285/404 |
| 2005/0155660 A1 * | 7/2005 | Handley | E04D 13/08 |
| | | | 52/16 |
| 2009/0021006 A1 | 1/2009 | Hobbs | |
| 2014/0117661 A1 * | 5/2014 | Harman | E04D 13/08 |
| | | | 285/179 |
| 2020/0124214 A1 | 4/2020 | Morris et al. | |
| 2020/0370300 A1 | 11/2020 | Vitarelli | |

FOREIGN PATENT DOCUMENTS

| | | | | |
|---|---|---|---|---|
| FR | 2191694 A5 * | 6/1972 | | |
| GB | 2000841 A * | 1/1979 | | F16L 27/0804 |
| JP | 08158564 A * | 6/1996 | | |

* cited by examiner

FITTING FOR A RAIN GUTTER DOWNPIPE

CROSS-REFERENCE TO RELATED APPLICATIONS

This application claims the benefit of Canadian Application No. 3,085,075, filed Jun. 30, 2020, the contents of all of which are incorporated by reference herein.

FIELD OF THE INVENTION

The present invention relates in general to water discharge systems for buildings to rain gutters. More particularly, the present invention relates to a fitting for a rain gutter downpipe.

BACKGROUND OF THE INVENTION

Rainwater collection and discharge systems are found on most commercial and residential buildings to collect and divert rainwater falling on a roof, off of the roof. Typically, rain gutters (also known as eavestroughs) are used to collect rainwater falling on a structure's roof and carry the rainwater to one or more downpipes (also known as downspouts), which are fluidly connected to the rain gutters. Downpipes are typically attached to exterior walls of a building and configured to direct the rainwater received from the rain gutters onto the ground, or into a sub-surface drain system.

When the downpipes are configured to direct the rainwater from the roof onto the ground, the bottom end of the downpipe is typically configured to discharge the rainwater away from the building's foundation. To serve the function of discharging the rainwater away from the building's foundation, conventional rainwater collection and discharge systems are configured such that the bottom ends of the downpipes extend laterally away from the building's wall. For example, a downpipe may include a 90° elbow at its bottom end. In some cases, an extender pipe may be attached to the 90° elbow if it is desired to discharge the rainwater further away from the building's foundation.

However, configuring the end of the downpipe to extend laterally away from the building's wall in this way causes a tripping hazard for people walking around the building. If a downpipe extender is also attached to the downpipe, the tripping hazard will be even more of an issue.

Moreover, downpipes sticking out from a building are susceptible to being damaged, when accidentally kicked or bumped by unsuspecting persons walking around the building. Conventional downpipes and downpipe extenders are rigidly connected together with self tapping screws, which imparts a significant twisting force to be applied to the downpipe, when its bottom end is kicked or bumped. Such a twisting force being applied to the downpipe can cause significant damage to the downpipe, including disconnecting sections of downpipe from one another, breaking straps holding sections of the downpipe to the building's wall, and event detaching sections of downpipe from the buildings wall.

Examples of attempts for solving the above problem include those disclosed in U.S. Pat. Nos. 5,150,930; 5,358,006; 5,511,829; 5,813,701; 6,223,777; 6,318,410; 8,590,943; 8,607,827; 8,801,049; 8,864,180; 9,091,071; and 10,801,652; and U.S. Pat. App. Pub. Nos. 2009/0021006; 2020/0124214; and 2020/0370300. For greater certainty, the disclosure of the above references is not an admission that they are relevant or applicable under the patent law in Canada, the U.S., or any other country where this patent application has been filed, and is without prejudice to any position that the applicant may wish to assert with respect to the same in the future. However, there is a continuing need for improvements in rainwater collection and discharge systems.

SUMMARY OF THE INVENTION

What is desired is a fitting for a rain gutter downpipe which may overcome at least some of the problems with the prior art.

According to a preferred embodiment of the present invention, the rain gutter downpipe fitting is configured to attach to a rain gutter downpipe between a top end of the downpipe and a bottom end of the downpipe, to allow a section of the downpipe below the downpipe fitting to freely rotate relative to a section of the downpipe above the downpipe fitting.

Preferably, the downpipe fitting may be formed from two parts connected together and rotatable relative to one another about a longitudinal axis of the downpipe fitting. The first part has an inlet which may be sized and shaped to couple with an outlet of a first section of the downpipe, above the downpipe fitting, and the second part has an outlet which may be sized and shaped to couple with an inlet of a second section of the downpipe, below the downpipe fitting. In this way, any rotational movement of the second section of downpipe below the downpipe fitting, about the longitudinal axis, will be decoupled from the first section of downpipe above the downpipe fitting. As a result, if the second section of the downpipe below the downpipe fitting is accidentally kicked or bumped, the second section will be free to rotate in the direction of the kick or bump, without imparting a damaging twisting force to the first section of the downpipe. Accordingly, the downpipe may be protected against this mode of damage by decoupling the first section of the downpipe from rotational movement of the second section of the downpipe, in this way.

Preferably, the two parts may be configured to snap fit together, wherein one of the two parts defines an annular channel or groove, and the other of the two parts defines an annular edge or ridge, which is adapted to snap fit into the annular groove to rotatably couple the two parts together.

It is contemplated that the inlet and the outlet of the downpipe fitting may be formed in various sizes and shapes, to couple with various known downpipes and downpipe accessories, some of which may be standard, whereas others may be non-standard. As such both of the inlet and the outlet may be square, rectangular, round, or oval in cross-section, and either male (i.e. adapted to be inserted into a section of downpipe) or female (i.e. adapted to receive a section of downpipe inserted therein). All such embodiments are comprehended by the present invention.

Therefore, in accordance with one aspect of the present invention, there is disclosed a downpipe fitting for coupling between a top and a bottom of a rain gutter downpipe, said downpipe fitting comprising:

a first part having an inlet at one end, said inlet being sized and shaped to couple with a first section of said downpipe above said downpipe fitting;

a second part having an outlet at one end, said outlet being sized and shaped to couple with a second section of said downpipe below said downpipe fitting;

a rotatable joint joining the other end of said first part to the other end of said second part, said rotatable joint comprising one of an annular ridge and an annular groove on one of said other ends, and the other of said annular ridge and said annular groove on the other one of said other ends; and a flow path for rainwater through said downpipe fitting from said inlet to said outlet via said rotatable joint;

wherein rotation of said second section of said downpipe about a longitudinal axis defined by said downpipe fitting is decoupled from said first section of said downpipe by said rotatable joint.

In accordance with another aspect of the present invention, there is disclosed a method of protecting a downpipe from a twisting force.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 1:
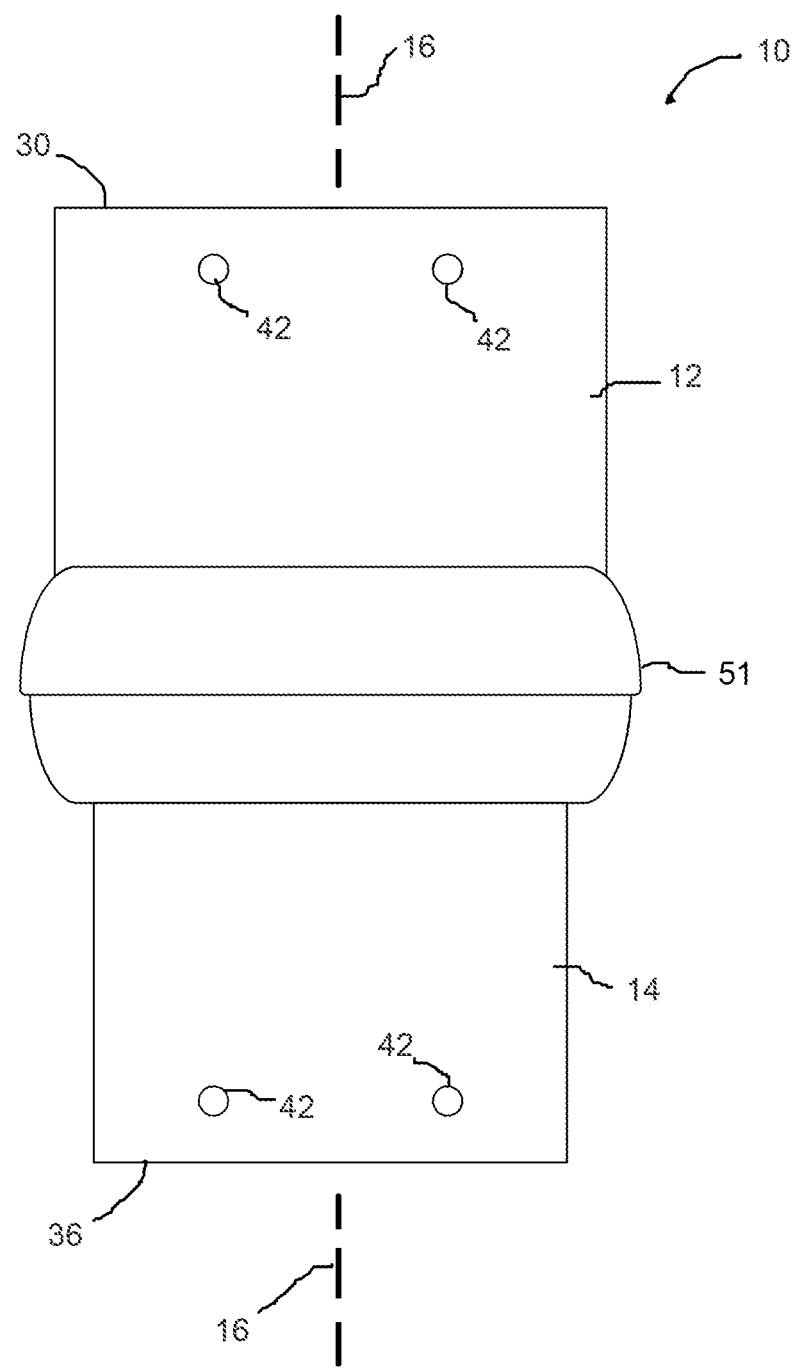
FIG. 1 is a side view of a rain gutter downpipe fitting according to an embodiment of the present invention.

A rain gutter downpipe fitting 10 according to an embodiment of the present invention is shown in FIG. 1. As shown, the downpipe fitting 10 has a first part 12 and a second part 14. The first and second parts 12, 14 of the downpipe fitting 10 are connected together and rotatable relative to one another about a longitudinal axis 16 of the downpipe fitting 10, as described in more detail below. Preferably, the downpipe fitting 10 may be made by molding the two parts 12, 14 separately from a weather resistant plastic material, such as for example ABS. Preferably, the plastic material is one which is capable of handling −40° C. winters, and +30° C. summers.

Figure 2:
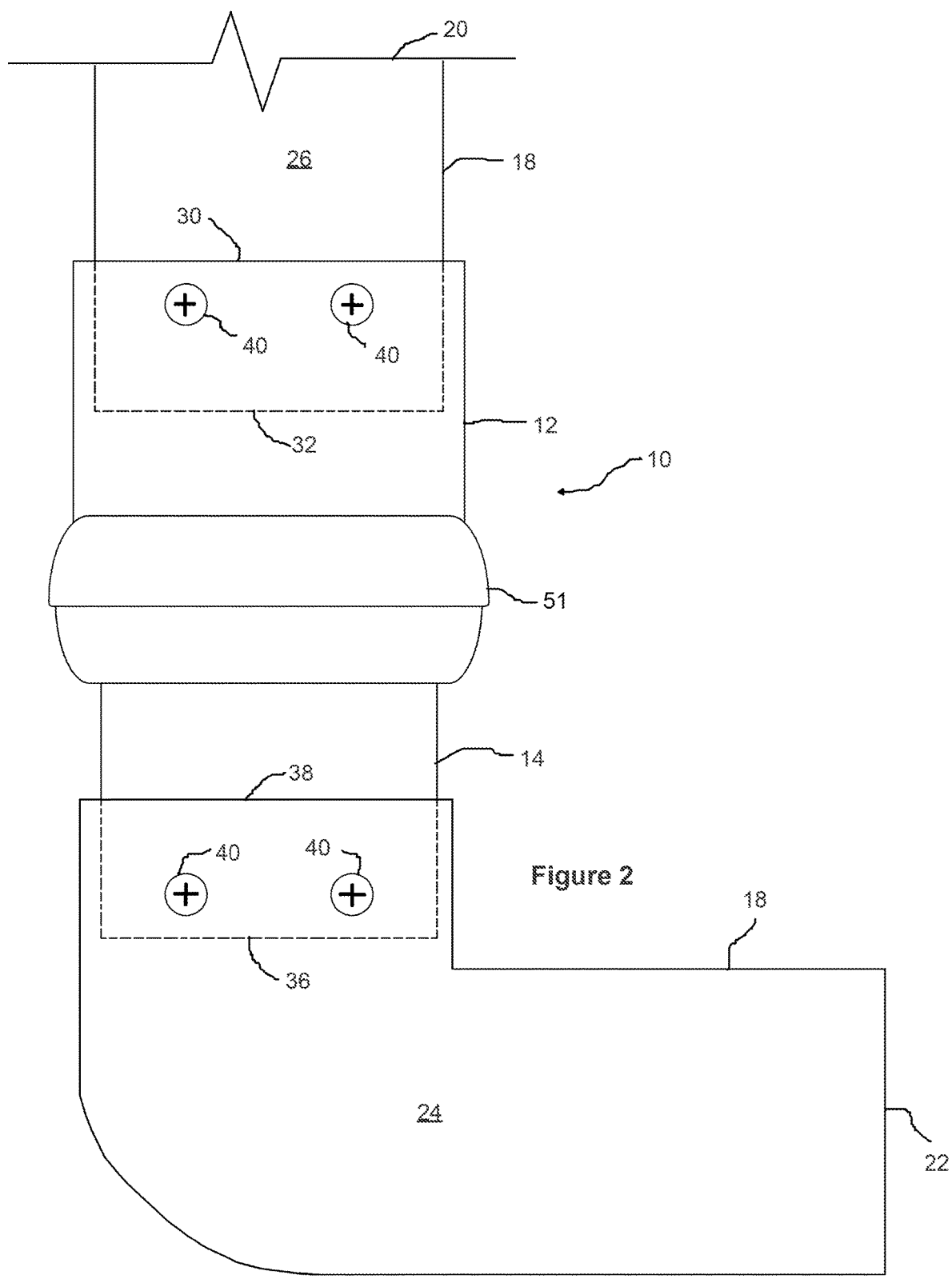
FIG. 2 is a side view of the downpipe fitting of FIG. 1 attached to a downpipe featuring a 90° elbow.

Referring now to FIG. 2, the downpipe fitting 10 is configured to attach to a rain gutter downpipe 18 between a top end 20 of the downpipe 18 and a bottom end 22 of the downpipe 18, to allow a second section 24 of the downpipe 18 below the downpipe fitting 10 to freely rotate relative to a first section 26 of the downpipe 18 above the downpipe fitting 10.

The first part 12 of the two-part downpipe fitting 10 has an inlet 30 which may preferably be sized and shaped to couple with an outlet 32 of the first section 26 of a downpipe 18, above the downpipe fitting 10. The second part 14 has an outlet 36 which may be sized and shaped to couple with an inlet 38 of the second section 24 of the downpipe 18, below the downpipe fitting 10. In this way, any rotational movement of the second section 24 of downpipe 18 below the downpipe fitting 10, about the longitudinal axis 16, will be decoupled from the first section 26 of the downpipe 18 above the downpipe fitting 10.

Preferably, the coupling of the first section 26 of the downpipe 18 to the inlet 30 of the downpipe fitting 10 may be secured with fasteners 40, including self-tapping screws. Similarly, the coupling of the second section 24 of the downpipe 18 to the outlet 36 of the downpipe fitting 10 may be secured with fasteners 40, including self-tapping screws. As best seen in FIG. 1, apertures 42, marks, or dimples may be provided in the first and second parts 12, 14 to facilitate securement of the couplings between the downpipe fitting 10 and the first and second sections 26, 24, with the fasteners 40. As will be appreciated, although the couplings need not be watertight, they should preferably be sufficiently leak proof to ensure that the majority of the rainwater draining into the top end 20 of the downpipe 18 from the gutter (not shown) is directed through the downpipe fitting 10 to the second section 24 of the downpipe 18 and out the bottom end 22 of the downpipe 18.

In the example shown in FIG. 2, the inlet 30 of the first part 12 of the downpipe fitting 10 is female for receiving the outlet 32 of the first section 26 of the downpipe 18 therein. The outlet 36 of the second part 14 is male for insertion into the inlet 38 of the second section 24 of the downpipe 18, which includes a 90° elbow. The second section 24 may be longer or shorter than being shown in the drawings, which are not to scale. In particular, the portion of the second section 24 of the downpipe 18 ahead of the bend in the elbow may be longer or shorter than is shown in the drawings. Similarly, the portion of the second section 24 of the downpipe 18 after the bend in the elbow may be longer or shorter than is shown in the drawings.

Furthermore, the inlet 30 and outlet 36 have rectangular cross-sections for coupling to a downpipe 18 having a rectangular cross-section measuring about 2 inches by 3 inches. In particular, the bottom portion of the first section 26 of the downpipe 18 has a rectangular cross-section measuring about 2 inches by 3 inches, which is received in the inlet 30 of the downpipe fitting 10, and the inlet 38 of the second section 24 of the downpipe 18 has a rectangular cross-section measuring about 2 inches by 3 inches, which receives a portion of the outlet 36 of the downpipe fitting 10.

However, the inlet 30 and the outlet 36 of the downpipe fitting 10 may be formed in various sizes and shapes, to couple with various known downpipes 18 and downpipe accessories (not shown), some of which may be standard, whereas others may be non-standard. As such, it is contemplated that both of the inlet 30 and the outlet 36 may be square, rectangular, round, or oval in cross-section, and either male (i.e. adapted to be inserted into a first or second 26, 24 of downpipe 18) or female (i.e. adapted to receive a first or second section 26, 24 of downpipe 18 inserted therein). All such embodiments are comprehended by the present invention.

Figure 3:
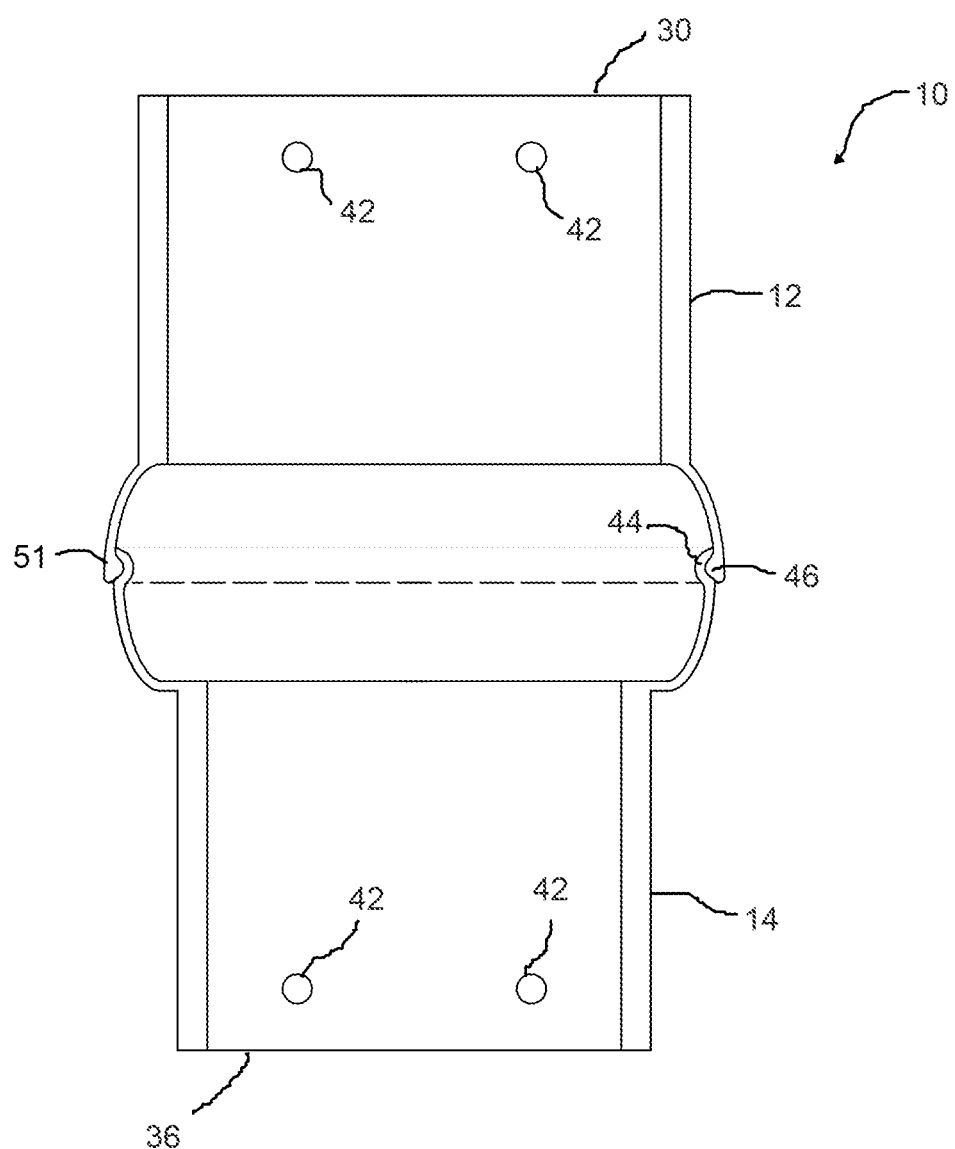
FIG. 3 is a cross-sectional view of the downpipe fitting of FIG. 1.

Referring now to FIG. 3, which shows a cross-sectional view of the downpipe fitting 10, the first and second parts 12, 14 of the downpipe fitting 10 may preferably be configured to snap fit together. Preferably, one of the two parts, in this example the second part 14, defines an annular channel or groove 44, and the other of the two parts, in this example the first part 12, defines an annular edge or ridge 46, which is adapted to snap fit into the annular groove 44 to rotatably join the two parts together. As will be appreciated, once the first part 12 is snapped in place over the second part 14 with the annular ridge 46 slidably retained in the annular groove 44, the rotatable joint 51 allows the second part 14 to freely rotate about the longitudinal axis 16 relative to the first part 12. It is contemplated that the locations of the annular groove 44 and the annular ridge 46 forming the rotatable joint 51 may be reversed, such that the first part 12, defines the annular groove 44 of the rotatable joint 51, and the second part 14, defines an annular ridge 46 forming the rotatable joint 51. All such embodiments are comprehended by the present invention.

With continued reference to FIG. 3, the annular groove 44 may preferably be formed to be substantially C-shaped in cross-section, and the annular ridge 46 may be formed with a rounded portion in cross-section, and configured to be retained by the C-shaped annular groove, as shown. Preferably, the annular ridge 46 may extend laterally from the first part 12 or the second part 14, perpendicular to the longitudinal axis 16. Although the first part 12 is shown in FIG. 3 as including the annular groove 44, and the second part 14 as including the annular ridge 46, it is contemplated that this may be reversed, such that the first part 12 may instead include the annular ridge 46, and the second part 14 may instead include the annular groove 44. All such embodiments are comprehended by the present invention.

Referring back to FIG. 2, it will now be understood that because the second part 14 of the downpipe fitting 10 is substantially free to rotate relative to the first part 12, if the second section 24 of the downpipe 18 below the downpipe fitting 10 is accidentally kicked or bumped, the second section 24 is free to rotate in the direction of the kick or bump, without imparting a damaging twisting force to the first section 26 of the downpipe 18.

Accordingly, the downpipe 18 may be protected against this mode of damage by decoupling the first section 26 of the downpipe 10 from rotational movement of the second section 24 of the downpipe 18, in this way. Additionally, the ability of the second section 24 to rotate in the direction of the impact force may reduce the damage inflicted on the second section 24 by the impact. Moreover, the ability of the second part 14 to be rotated relative to the first part 12 allows the second section 24 of the downpipe 18 to be moved out of the way, such that it does not pose a hazard for people, when it is not needed. Advantageously, since the rotatable joint 51 limits the movement of the second part 14 relative to the first part 12 to rotational movement in one dimension about the longitudinal axis 16, the second section 24 of the downpipe 18 attached to the second part 14 may be easily moved back to its original position after an impact event, by pulling or pushing on the second section 24 about the longitudinal axis 16 defined by the downpipe fitting 10, as permitted by the rotatable joint 51.

Figure 4:
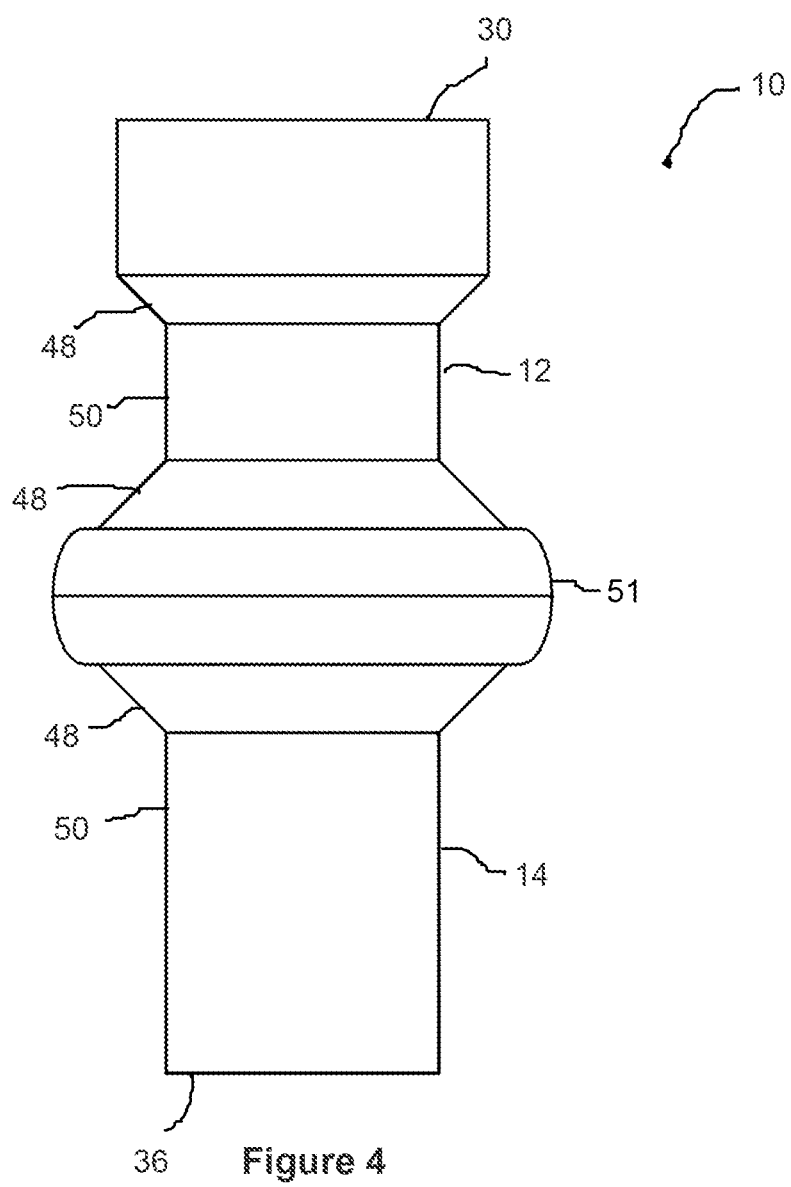
FIG. 4 is side view of the downpipe fitting according to another embodiment of the present invention.

FIG. 4 shows a downpipe fitting 10 according to another embodiment of the present invention. In this example, the first part 12 includes a pair of transition portions 48, with a region 50 having a reduced cross-sectional area sandwiched therebetween. As can be seen, the region 50 has a reduced cross-sectional area as compared to the cross-sectional area of the inlet 30, and the cross-sectional area of the annular connection between the first and second parts 12, 14. The pair of transition portions 48 gives the first part 12 an hourglass shape. The second part 14, on the other hand, includes only one transition portion 48. The one transition portion 48 gives the second part 14 a funnel shape. As will be appreciated, the transition portions 48 and regions 50 having reduced cross-sectional areas allows less material to be used to make each downpipe fitting 10, which may translate into cost savings for manufacturing downpipe fittings 10. However, the transition portions 48 may be omitted, for example, in embodiments where a larger cross-sectional area is desired through the rotatable joint 51.

Figure 5:
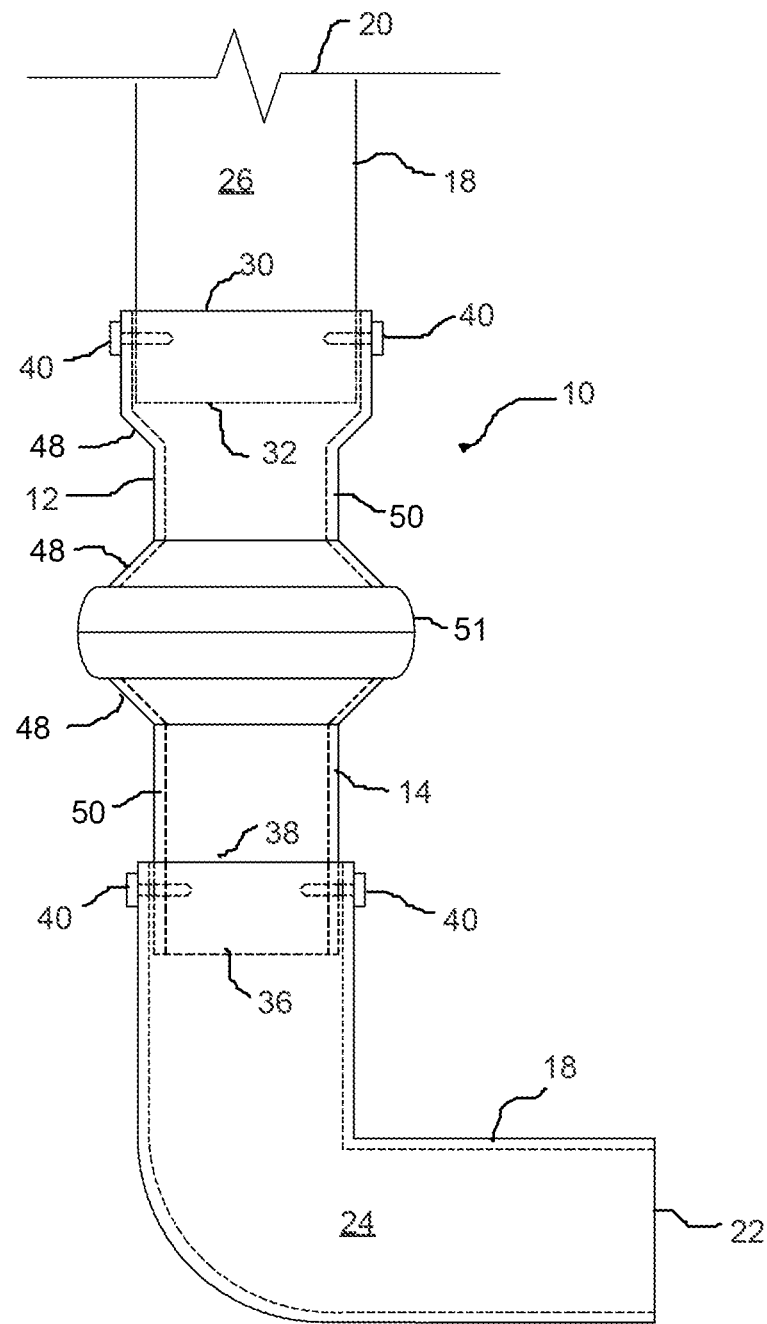
FIG. 5 is a side view of the downpipe fitting of FIG. 4 attached to a downpipe featuring a 90° elbow.

Referring now to FIG. 5, the downpipe fitting 10 of FIG. 4 is shown coupled to first and second sections 26, 24 of the downpipe 18, and the couplings are secured with fasteners 40.

Figure 6:
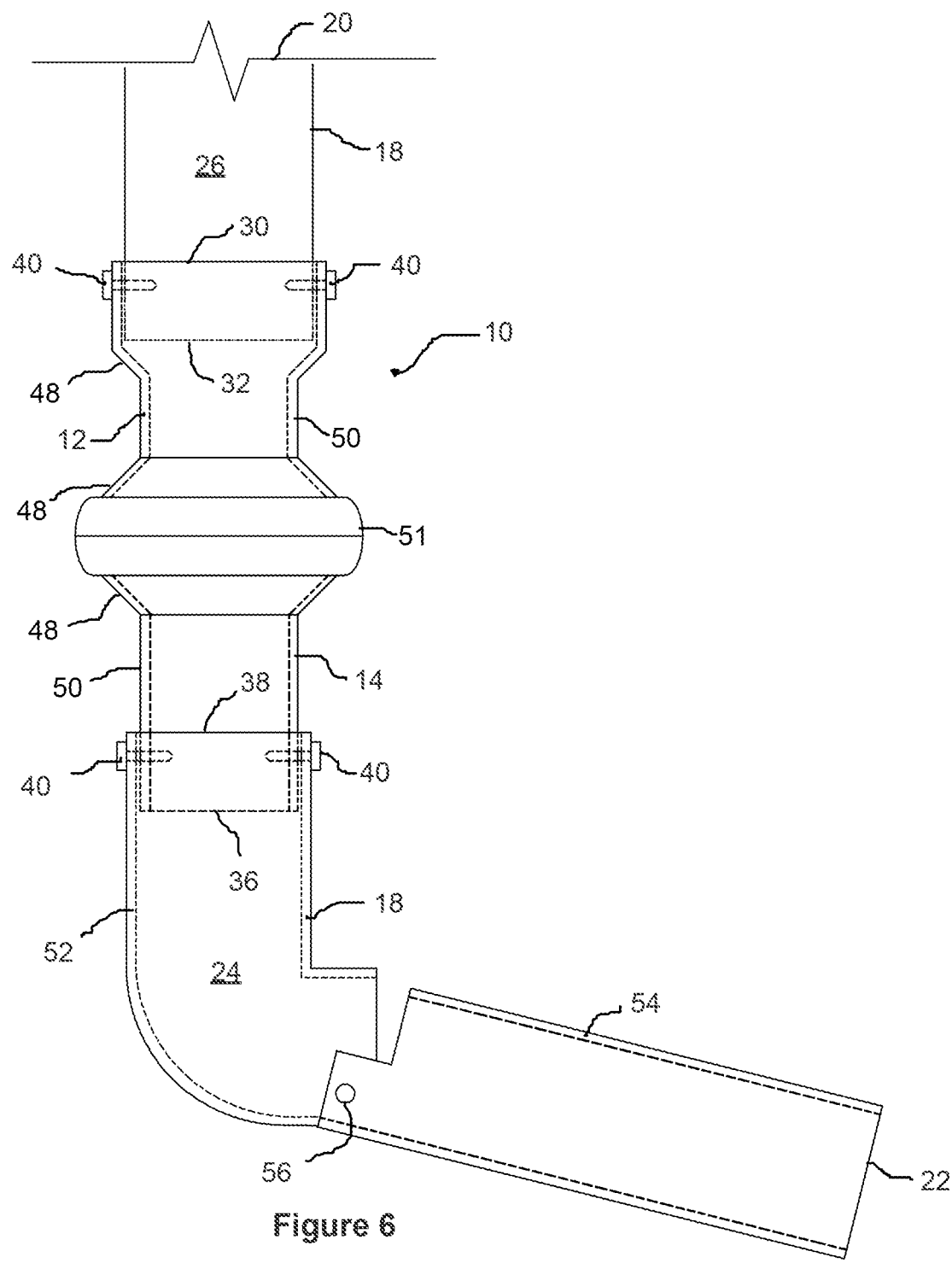
FIG. 6 is a side view of the downpipe fitting of FIG. 4 attached to a downpipe featuring an articulating elbow.

The second section 24 of the downpipe 18 need not be limited to a 90° elbow or a like elbow with a fixed angle. Instead, as shown in FIG. 6, the second section 24 may comprise an articulating elbow. By way of example, the articulating elbow may include a first conduit 52 coupled to the outlet 36 and extending downwardly therefrom toward the ground, and a second conduit 54 hingedly attached to the first conduit via a hinge 56. In this way, if the articulating elbow is accidentally kicked or bumped, the second conduit 54 may swing up or down as it slides over the ground radially about the longitudinal axis 16.

Figure 7:
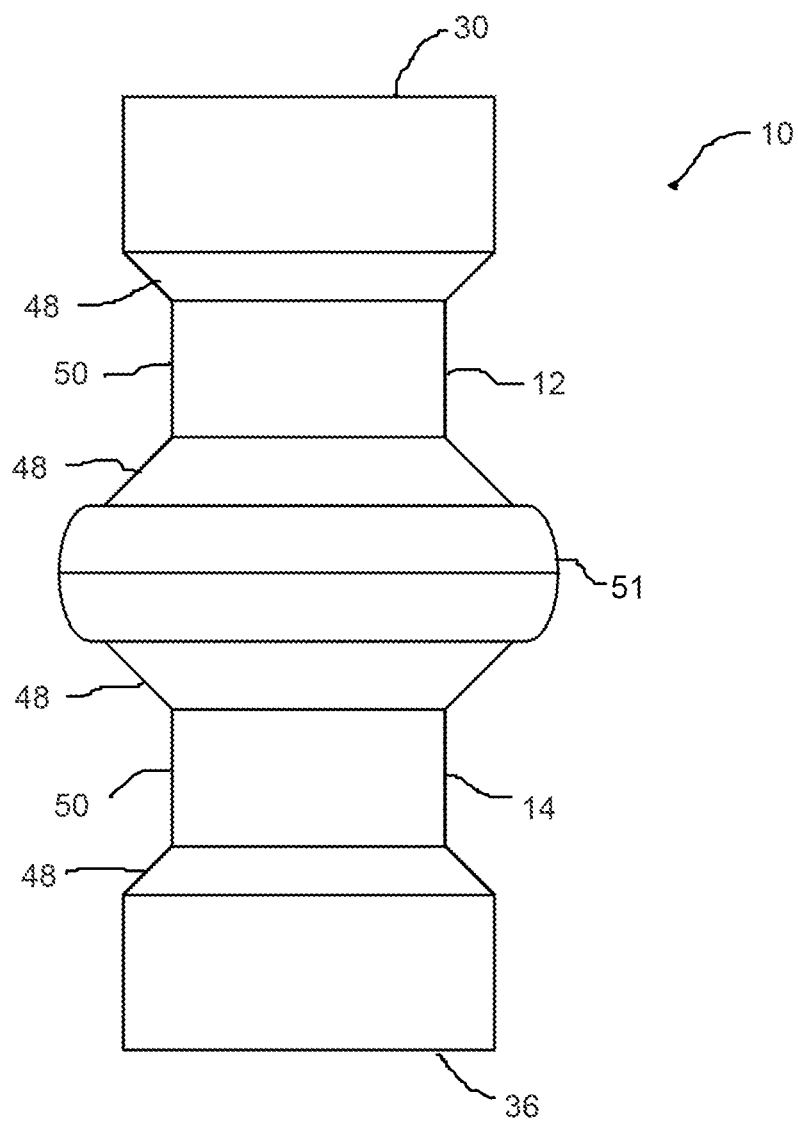
FIG. 7 is a side view of the downpipe fitting according to yet another embodiment of the present invention.
Figure 8:
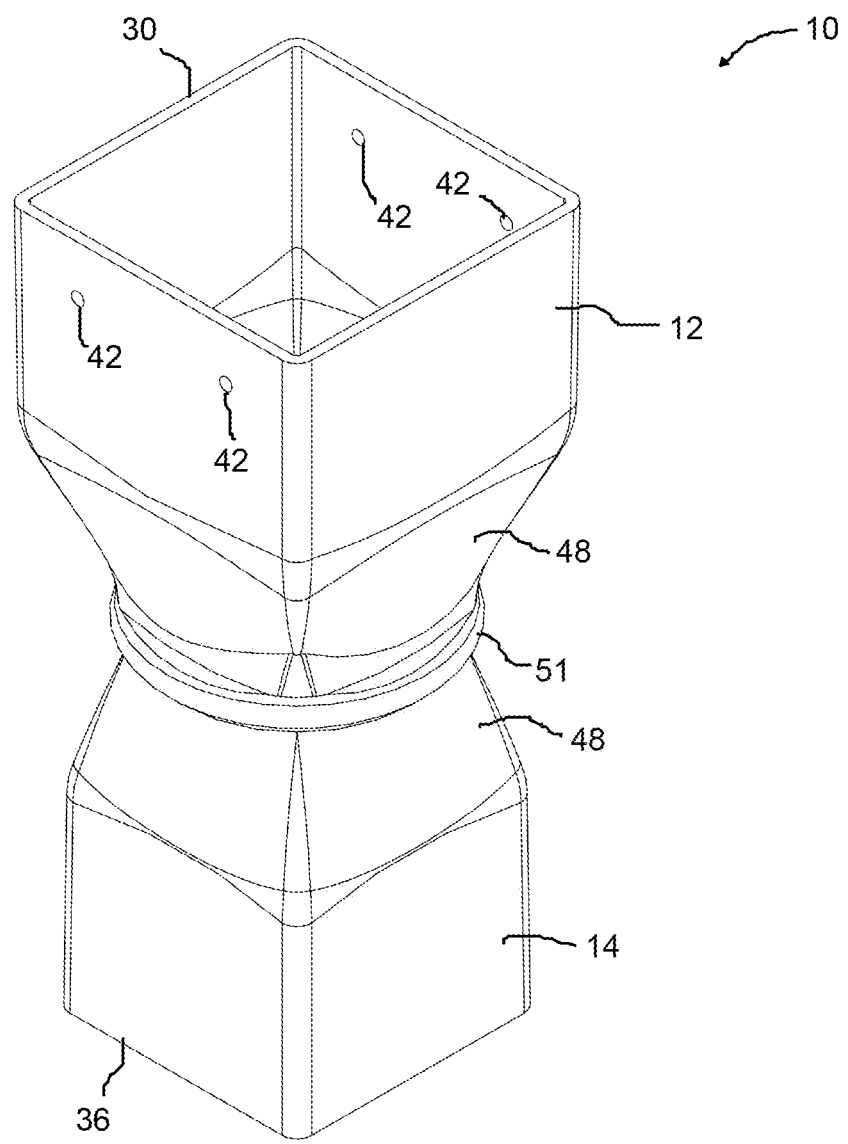
FIG. 8 is a perspective view of a rain gutter downpipe fitting according to yet another embodiment of the present invention.
Figure 9:
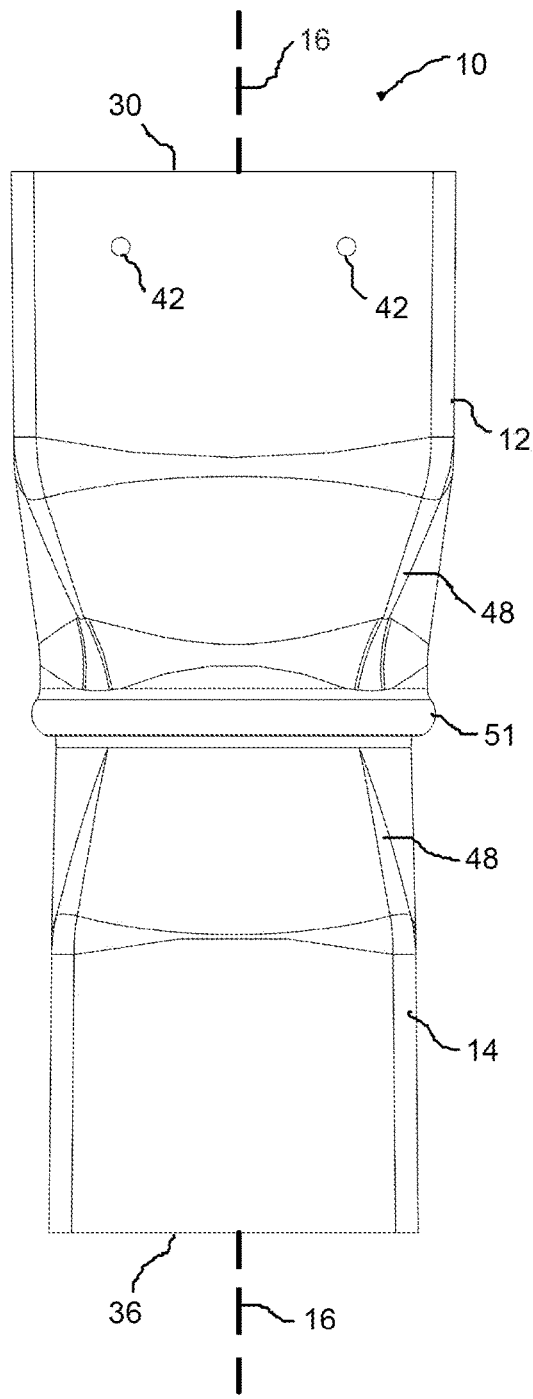
FIG. 9 is a front view of the downpipe fitting of FIG. 8.
Figure 10:
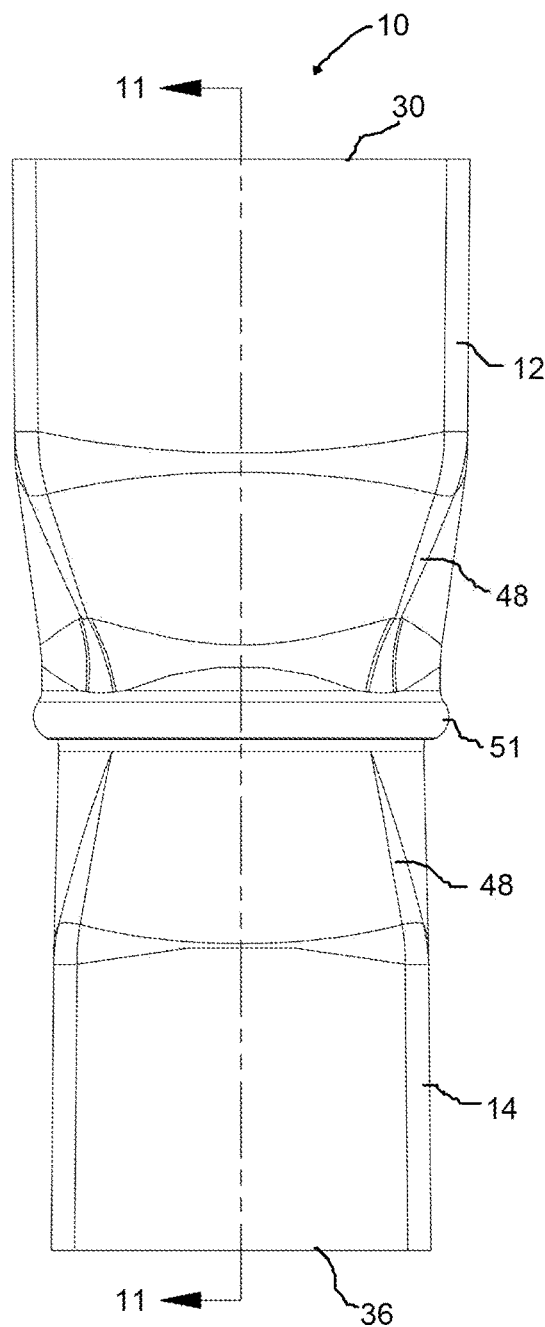
FIG. 10 is side view of the downpipe fitting of FIG. 8.

FIG. 7 shows a downpipe fitting 10 according to another embodiment of the present invention. In this example, the first part 12 includes a pair of transition portions 48, with a region 50 having a reduced cross-sectional area sandwiched therebetween. As can be seen, the region 50 has a reduced cross-sectional area as compared to the cross-sectional area of the inlet 30, and the cross-sectional area of the annular connection between the first and second parts 12, 14. The pair of transition portions 48 give the first part 12 an hourglass shape. The second part 14 also includes a pair of transition portions 48, with a region 50 having a reduced cross-sectional area sandwiched therebetween. The region 50 has a reduced cross-sectional area as compared to the cross-sectional area of the annular connection between the first and second parts 12, 14, and the cross-sectional area of the outlet 36. The pair of transition portions 48 also give the second part 14 an hourglass shape.

FIGS. 8 to 13 show a downpipe fitting 10 according to yet another embodiment of the present invention. In this example, the first part 12 includes an inlet 30 sized and shaped to connect to a downpipe 18. Although the inlet 30 is shown as being square in cross-section, and suited to square shaped downpipe 18, the inlet 30 may be formed in other shapes and sizes, including circular in cross-section. Preferred shapes and sizes of the inlet 30 include those which will allow the downpipe fitting 10 to be attached to standard downpipes. Similarly, the second part 14 includes an outlet 36 sized and shaped to connect to a downpipe 18 below the downpipe fitting 10. Although the outlet 36 is shown as being square in cross-section, and suited to square shaped downpipe 18, the outlet 36 may be formed in other shapes and sizes, including circular in cross-section. Preferred shapes and sizes of the outlet 36 include those which will allow the downpipe fitting 10 to be attached to standard downpipes. Examples of standard downpipes include, 2 inch by 3 inch, 2⅝ inch by 2⅝ inch, 3 inch by 3 inch, and 3 inch by 4 inch. In this way, the downpipe fitting 10 may be inserted in a position between a top end 20 and a bottom end 22 of the down pipe 18, to allow the second section 24 of the downpipe 18 below the downpipe fitting 10 to freely rotate relative to a first section 26 of the downpipe 18 above the downpipe fitting 10. A portion of the downpipe 18 may need to be removed to accommodate the length of the downpipe fitting 10, if it is desired to keep the overall length of the downpipe 18 unchanged.

Figure 11:
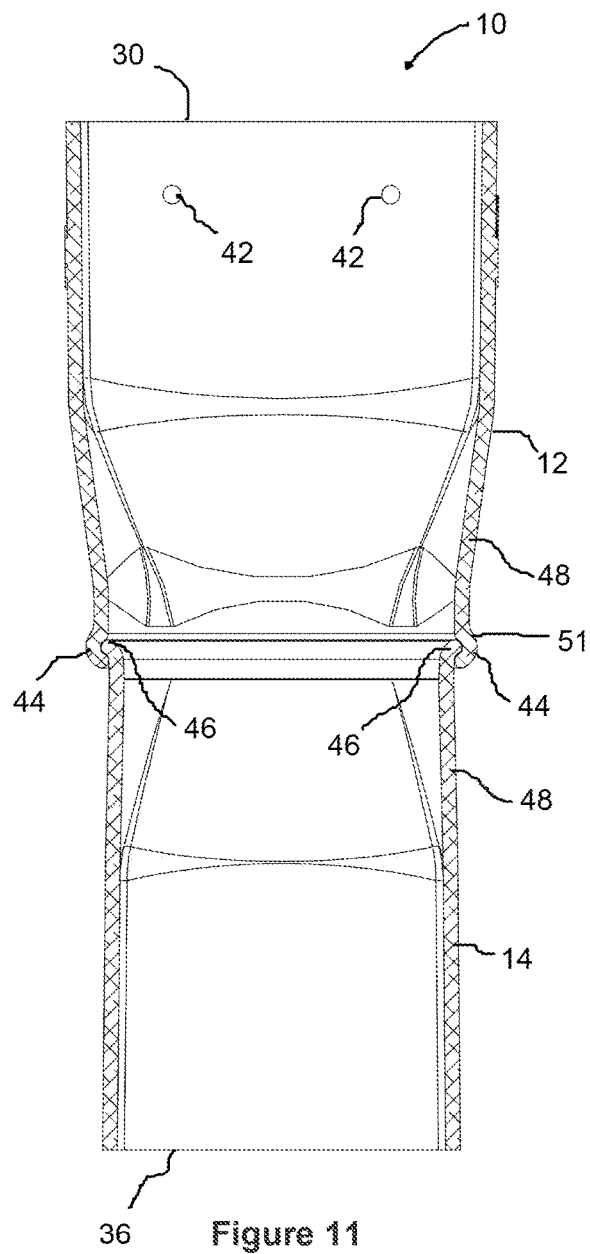
FIG. 11 is a cross-sectional view of the downpipe fitting taken along line 11-11 of FIG. 10.
Figure 12:
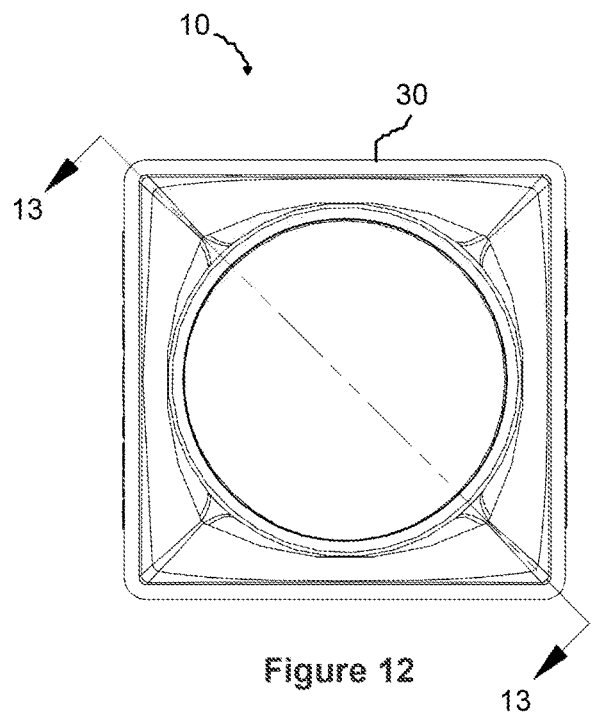
FIG. 12 is a top view of the downpipe fitting of FIG. 8.
Figure 13:
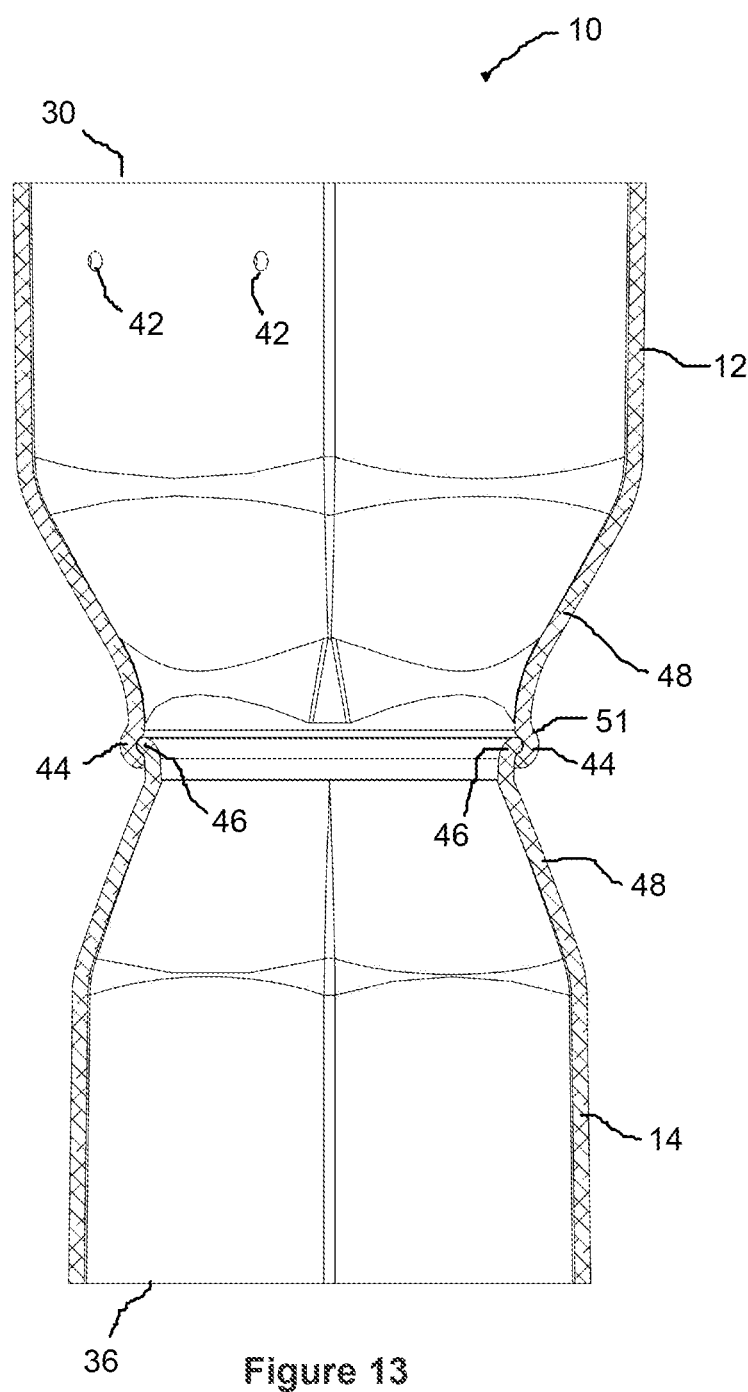
FIG. 13 is a cross-sectional view of the downpipe fitting taken along line 13-13 of FIG. 12.

As best seen in FIGS. 11 and 13, which show cross-sectional views of the downpipe fitting 10, the first and second parts 12, 14 of the downpipe fitting 10 may preferably be configured to snap fit together. Preferably, one of the two parts, in this example the first part 12, defines an annular channel or groove 44, and the other of the two parts, in this example the second part 14, defines an annular edge or ridge 46, which is adapted to snap fit into the annular groove 44 to rotatably join the two parts together. As will be appreciated, once the first part 12 is snapped in place over the second part 14 with the annular ridge 46 slidably retained in the annular groove 44, the rotatable joint 51 allows the second part 14 to freely rotate about the longitudinal axis 16 relative to the first part 12. As mentioned above, it is contemplated that the locations of the annular groove 44 and the annular ridge 46 forming the rotatable joint 51 may be reversed, such that the first part 12, defines the annular groove 44 of the rotatable joint 51, and the second part 14, defines an annular ridge 46 of the rotatable joint 51. All such embodiments are comprehended by the present invention.

In the example shown in FIGS. 8 to 13, the first part 12 includes transition portions 48, between the inlet 30 and the annular groove 44, and between the outlet 36 and the annular ridge 46, providing the rotatable joint 51 with a reduced cross-sectional area as compared to the cross-sectional area of the inlet 30 and the outlet 36. The transition portions 48 are funnel shaped, and give the downpipe fitting 10 an hourglass shape. As mentioned above, the transition portions 48 and the rotatable joint 51 formed with a reduced cross-sectional area allows less material to be used to make each downpipe fitting 10, which may translate into cost savings for manufacturing downpipe fittings 10. However, the transition portions 48 may be omitted, for example, in embodiments where a larger cross-sectional area is desired through the rotatable joint 51.

By way of example only, the downpipe fitting 10 shown in FIGS. 8 to 13 may be made to be about 7⅛ inches tall, with the inlet 30 having outer dimensions of 2⅞ inches by 2⅞ inches (and inner dimensions of 2⅝ inches by 2⅝ inches), and the outlet 36 having outer dimensions of 2⅜ inches by 2⅜ inches (and inner dimensions of 2⅛ inches by 2⅛ inches). According to this example, the first part 12 is about 3¾ inches tall, and the second part 14 is about 3⅝ inches tall. The outer diameter of the rotatable joint 51 is about 2½ inches, and the inner diameter of the rotatable joint 51 is about 2¼ inches. The walls of the downpipe fitting 10 are about ⅛ inch thick. It is further contemplated that the inlet 30 and/or the outlet 36 may be made with other dimensions, including, for example, inner or outer dimensions of 2 inches by 3 inches, 2 inches by 4 inches, and 3 inches by 3 inches, to match the dimensions of the downpipe 18 to which the downpipe fitting 10 is intended to be attached to. All such embodiments are comprehended by the present invention.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. For example, although the second section 24 of the downpipe 18 is shown as being a separate component (i.e. a 90° elbow) coupled to the outlet 36 of the downpipe fitting 10 and secured with fasteners 40, the second section 24 may instead be integrally formed with the outlet 36. Those of ordinary skill in the art having access to the teachings herein will recognize these additional variations, implementations, modifications, alterations and embodiments, all of which are within the scope of the present invention, which invention is limited only by the appended claims.

We claim:

1. A downpipe fitting for coupling between a top and a bottom of a rain gutter downpipe, said downpipe fitting comprising:
    a first part having an inlet at one end, an opposed other end, and a longitudinal extent therein between, said inlet being sized and shaped to couple with a first section of said downpipe above said downpipe fitting;
    a second part having an outlet at one end, an opposed other end, and a longitudinal extent therein between, said outlet being sized and shaped to couple with a second section of said downpipe below said downpipe fitting;
    a rotatable joint joining the opposed other end of said first part to the opposed other end of said second part, said rotatable joint comprising one of an annular ridge and an annular groove on one of said opposed other ends, and the other of said annular ridge and said annular groove on the opposed other one of said other ends; and
    a flow path for rainwater through said downpipe fitting from said inlet to said outlet via said rotatable joint;
    wherein said first part and said second part are configured to rotate about a substantially straight longitudinal axis defined by the longitudinal extents of said first and second parts and downpipe fitting,
    wherein rotation of said second section of said down pipe about the substantially straight longitudinal axis is decoupled from said first section of said downpipe by said rotatable joint, and
    wherein said inlet at said one end of said first part is rectangular or square in cross section,
    wherein said inlet of said first part has an inlet cross-sectional area,
    wherein said rotatable joint is circular in cross section,
    wherein said rotatable joint has a circular cross-sectional area with the circular cross-sectional area of said rotatable joint being smaller than the inlet cross-sectional area of said first part,
    wherein said outlet of said second part is rectangular or square in cross section,
    wherein said outlet of said second part has an outlet cross-sectional area larger than the circular cross-sectional area of said rotatable joint, and
    wherein the downpipe fitting further comprises:
        a first transition portion, that is a tapering rectangular or tapering square shape portion, said first transition portion extending from said first part to said rotatable joint, and a second transition portion, that is a tapering rectangular or tapering square shape portion, said second transition portion extending from said second part to said rotatable joint.

2. The downpipe fitting as claimed in claim 1, wherein said rotatable joint comprises a snap fit connection, wherein the other ends snaps over one another.

3. The downpipe fitting as claimed in claim 2, wherein said annular groove snaps over said annular ridge.

4. The downpipe fitting as claimed in claim 1, wherein said annular groove is substantially c-shaped in cross-section.

5. The downpipe fitting as claimed in claim 4, wherein said annular ridge has a rounded portion in cross-section, configured to be retained by said c-shaped annular groove.

6. The downpipe fitting as claimed in claim 1, wherein said annular ridge extends laterally outward from said other end perpendicular to said longitudinal axis.

7. The downpipe fitting as claimed in claim 1, wherein said first part comprises said annular groove, and said second part comprises said annular ridge.

8. The downpipe fitting as claimed in claim 1, wherein said first part comprises said annular ridge, and said second part comprises said annular groove.

9. The downpipe fitting as claimed in claim 1, wherein said second section of said downpipe comprises an elbow for discharging said rainwater.

10. The downpipe fitting as claimed in claim 9, wherein said elbow is configured to discharge said rainwater at a fixed angle relative to said longitudinal axis.

11. The downpipe fitting as claimed in claim 9, wherein said elbow is an articulating elbow configured to discharge said rainwater at a variable angle relative to said longitudinal axis.

12. The downpipe fitting as claimed in claim 9, wherein said second section of said down pipe is integrally formed with said second part.

13. The downpipe fitting as claimed in claim 1, wherein said second part further comprises an elbow for discharging said rainwater.

14. The downpipe fitting as claimed in claim 13, wherein said elbow is configured to discharge said rainwater at a fixed angle relative to said longitudinal axis.

15. The downpipe fitting as claimed in claim 13, wherein said fixed angle is about 90 degrees.

16. The downpipe fitting as claimed in claim 13, wherein said elbow is an articulating elbow configured to discharge said rainwater at a variable angle relative to said longitudinal axis.

17. The downpipe fitting as claimed in claim 1, wherein said outlet at said opposed other end of said second part is rectangular or square in cross section.

* * * * *